United States Patent [19]
Ito

[11] Patent Number: 5,120,178
[45] Date of Patent: Jun. 9, 1992

[54] WORKPIECE LOADING AND UNLOADING METHOD AND DEVICE FOR A PLATE PROCESSING MACHINE

[75] Inventor: Masaoki Ito, Hadano, Japan

[73] Assignee: Amada Company, Japan

[21] Appl. No.: 533,418

[22] Filed: Jun. 5, 1990

[30] Foreign Application Priority Data

| Jun. 6, 1989 | [JP] | Japan | 1-142244 |
| Jun. 12, 1989 | [JP] | Japan | 1-146728 |
| Jan. 12, 1990 | [JP] | Japan | 2-1198 |
| Jan. 30, 1990 | [JP] | Japan | 2-17914 |

[51] Int. Cl.⁵ .......................... B21D 43/20
[52] U.S. Cl. ............... 414/225; 414/286; 414/416; 414/933; 414/786
[58] Field of Search ........... 414/222, 225, 286, 416, 414/933, 786

[56] References Cited

U.S. PATENT DOCUMENTS

| 3,653,525 | 4/1972 | Merkner et al. | 414/416 |
| 4,362,454 | 12/1982 | Kripzak | 414/416 X |
| 4,690,021 | 6/1987 | Clark | 83/23 |
| 4,691,817 | 9/1987 | Haar | 414/225 X |
| 4,709,605 | 5/1987 | Clark | 83/71 |
| 4,844,680 | 7/1989 | Kawata et al. | 414/286 X |

FOREIGN PATENT DOCUMENTS

| 6154492 | 2/1982 | Japan . | |
| 0081028 | 5/1982 | Japan | 414/225 |
| 0206709 | 9/1986 | Japan | 414/416 |
| 2143199 | 2/1985 | United Kingdom | 414/416 |

Primary Examiner—David A. Bucci
Assistant Examiner—James Keenan
Attorney, Agent, or Firm—Wigman & Cohen

[57] ABSTRACT

A workpiece loading and unloading method and apparatus are disclosed especially for plate processing machines, such as a punch press. The apparatus includes a workpiece storage device positioned on one side of the plate processing machine and having a plurality of vertically arranged shelves for supporting pallets for storing workpieces to be loaded and finished products unloaded from the machine. An elevator device is provided for moving pallets to and from the storage device to a load/unload station where a transfer device picks up a workpiece from the pallet and moves it to the machine for processing and also picks up the finished product from the machine and returns it to a finished product pallet.

10 Claims, 10 Drawing Sheets

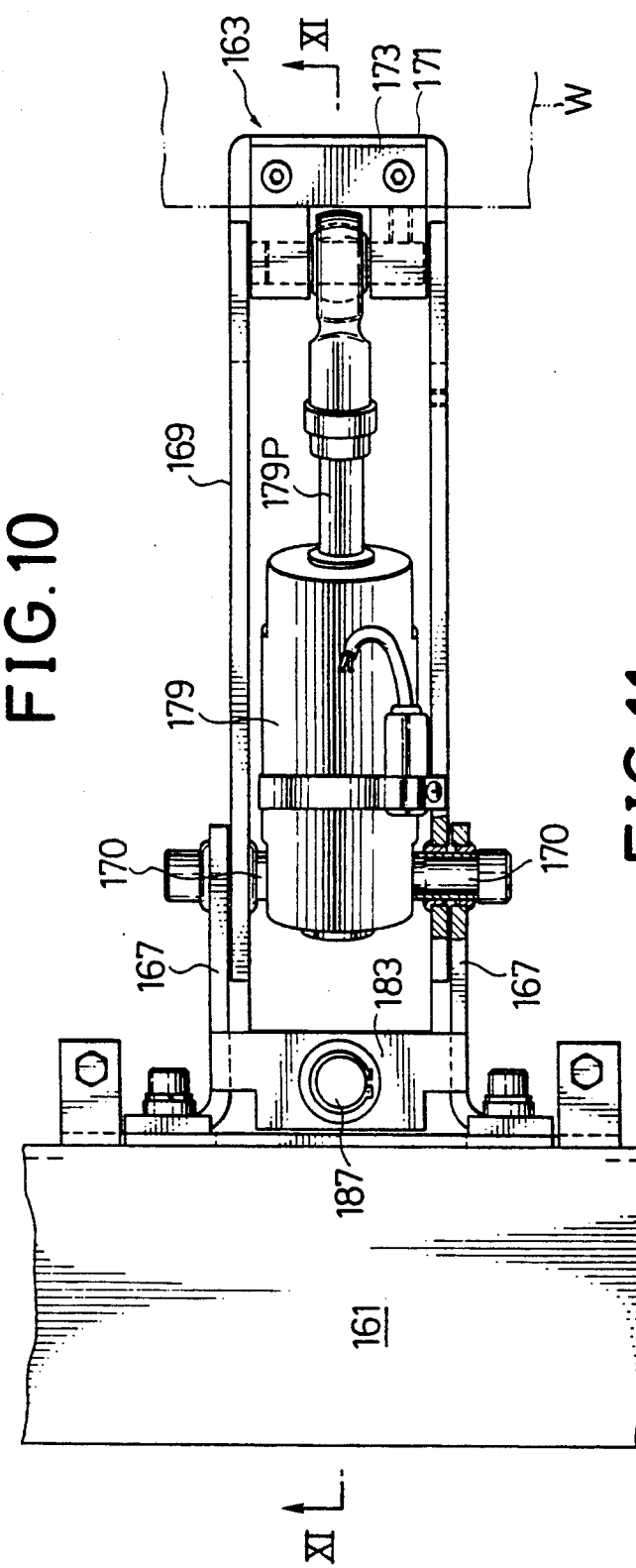
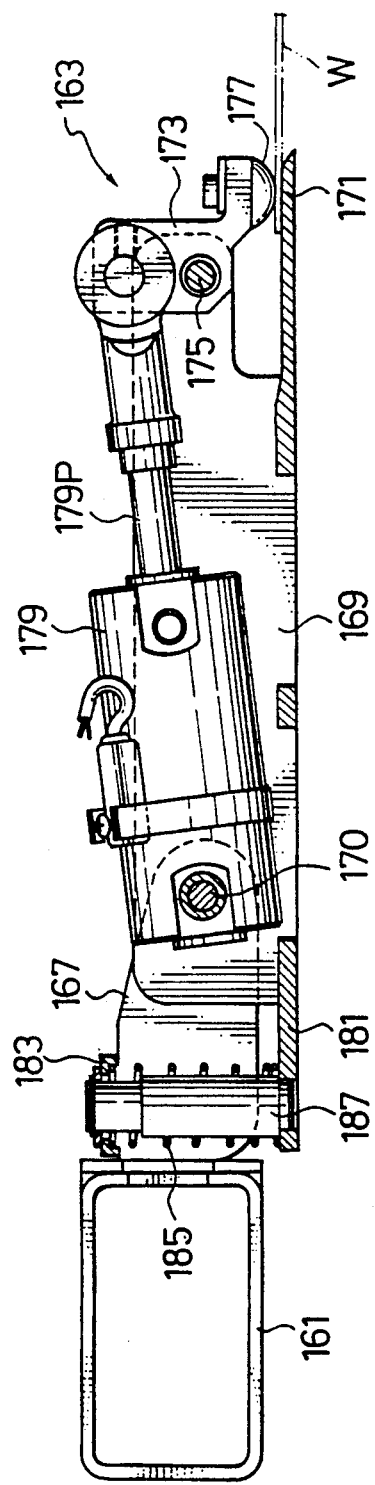

WORKPIECE LOADING AND UNLOADING METHOD AND DEVICE FOR A PLATE PROCESSING MACHINE

BACKGROUND OF THE INVENTION

Field of the Invention

The present invention relates to a workpiece loading and unloading method and device for loading a sheet workpiece into and for unloading a finished product from a plate processing machine such as, for example, a punch press and the like, and, in particular, to a workpiece loading and unloading method and device wherein the workpiece is loaded into and the finished product is unloaded from one side of the plate processing machine.

2. Description of the Prior Art

Conventionally, a sheet workpiece is loaded into a plate processing machine such as, for example, a plate punch press and the like, by a workpiece loading device positioned on one side of the plate processing machine, and the finished product after being processed in the plate processing machine is unloaded from the plate processing machine by a finished product unloading device generally positioned on the other side of the plate processing machine.

In this configuration, the positional relationship of the workpiece loading device, the plate processing machine, and the finished product unloading device is linear, therefore a comparatively large installation area is required, which can present a problem. A configuration wherein the workpiece loading device and the finished product unloading device are both positioned on one side of the plate processing machine is disclosed in, for example, Japanese Patent Publication No. S61-54492 (hereinafter referred to simply as the prior art). The configuration in this prior art wherein the workpiece loading device and the finished product unloading device are both positioned on the same side of provides the benefit of a comparably small installation area.

However, the workpiece loading device of the prior art has a configuration whereby, after the workpiece is secured and lifted by a suction device from a material pallet positioned adjacent to the finished product unloading device, the workpiece is conveyed to a position above the finished product unloading device, and from this position the workpiece is loaded into the plate processing machine.

Accordingly, in the prior art, the configuration of the workpiece loading device is complicated, which is also a problem.

In addition, in the prior art it is very difficult to classify and store workpiece and finished products of various shapes and sizes, so that unmanned, multiproduct, small number production runs are very difficult. This is another problem.

Further, in the prior art a support device which supports and loads the workpiece into the processing machine and a clamping device which clamps and unloads the finished product from the processing machine are provided separately. This complicates the configuration and is therefore another problem.

Yet further, because the workpiece is simply loaded into the plate processing machine in the conventional technology, it is necessary to provide another device for positioning the workpiece at a home-position in the plate processing machine. This is still another problem.

Also, in the conventional technology, when the end of the workpiece is clamped by the clamping devices provided on the workpiece loading device and the finished product unloading device, it is easy to create a bend in the end of the workpiece. This is undesirable and presents still another problem.

SUMMARY OF THE INVENTION

A first object of the present invention is to provide, with due consideration to the drawbacks of such conventional devices, a workpiece loading and unloading method and device with a configuration by which it is possible to easily load a sheet workpiece into and to unload a finished product from one side of a plate processing machine.

A second object of the present invention is to provide a workpiece loading and unloading method and device which can classify and store workpieces and finished products of various shapes and sizes, and can accommodate unmanned, multiproduct, small number production runs.

These objects are achieved by the present invention of a method of loading a sheet workpiece into and of unloading a finished product from a plate processing machine, comprising the steps of providing on one side of the plate processing machine which processes the sheet workpiece, a loading and unloading station where an operation of loading of the workpiece into and of unloading of a finished product from the plate processing machine is performed; providing a first station on one side of the loading and unloading station and a second station on the other side of the loading and unloading station; providing a material pallet which moves reciprocally between the loading and unloading station, and the first station or the second station; positioning the material pallet at the loading and unloading station; separating at least one workpiece from a plurality of workpieces carried on the material pallet, and loading the workpiece into the workpiece processing machine by means of a loading and unloading transfer device; transferring the material pallet from the loading and unloading station to the first station or to the second station, and transferring a finished product pallet, which is movable between the loading and unloading station and the second station or the first station, to the loading and unloading station during the processing of the workpiece in the plate processing machine; transferring a finished product processed in the plate processing machine to the finished product pallet positioned at the loading and unloading station, by means of the workpiece loading and unloading transfer device; transferring the finished product pallet to the second station or the first station; transferring once again the material pallet to the loading and unloading station for loading a next workpiece into the plate processing machine.

In addition, a device for loading a workpiece to and for unloading a finished product from a plate processing machine which processes a sheet workpiece, comprising: a workpiece storage device positioned on one side of the plate processing machine wherein a plurality of pallet storage shelves, on which are stored a plurality of material pallets carrying the workpieces to be loaded into the plate processing machine and a plurality of finished product pallets on which are to be carried the finished products processed in the plate processing machine, are arranged one above the other; a first lifter device which moves the material pallets or the finished product pallets vertically in the loading and unloading station provided on the lower part of the workpiece storage device for loading the workpiece to the plate processing machine and for unloading the finished products from the plate processing machine; an elevator device provided in a manner allowing free vertical motion at a first station positioned on one side of the loading and unloading station, for conveying a material pallet or a finished product pallet from a suitable pallet storage shelf in the workpiece storage device to the first lifter device, or for conveying a material pallet or a finished product pallet on the first lifter device to a suitable pallet storage shelf in the workpiece storage device; a second lifter device provided in a manner allowing free vertical motion at the second station situated on the other side of the loading and unloading station, for temporarily supporting a finished product pallet or a material pallet previously loaded on the first lifter device when the material pallet or the finished product pallet is transferred to the first lifter device from the elevator device; and a workpiece loading and unloading transfer device which picks up at least one workpiece from the material pallet supported on the first lifter device positioned at the loading and unloading station and loads it to the plate processing machine, and which conveys the finished product processed in the plate processing machine to the finished product pallet which had been transferred onto the first lifter device.

BRIEF DESCRIPTION OF THE DRAWINGS

These and other objects, features, and advantages of the present invention will become more apparent from the following description of the preferred embodiments taken in conjunction with the accompanying drawings, in which:

FIG. 10 is a detailed plan view of the part indicated by the arrow X in FIG. 9.

FIG. 11 is a sectional drawing taken along the lines XI—XI in FIG. 10.

DETAILED DESCRIPTION OF THE PREFERRED EMBODIMENTS

Figure 1:
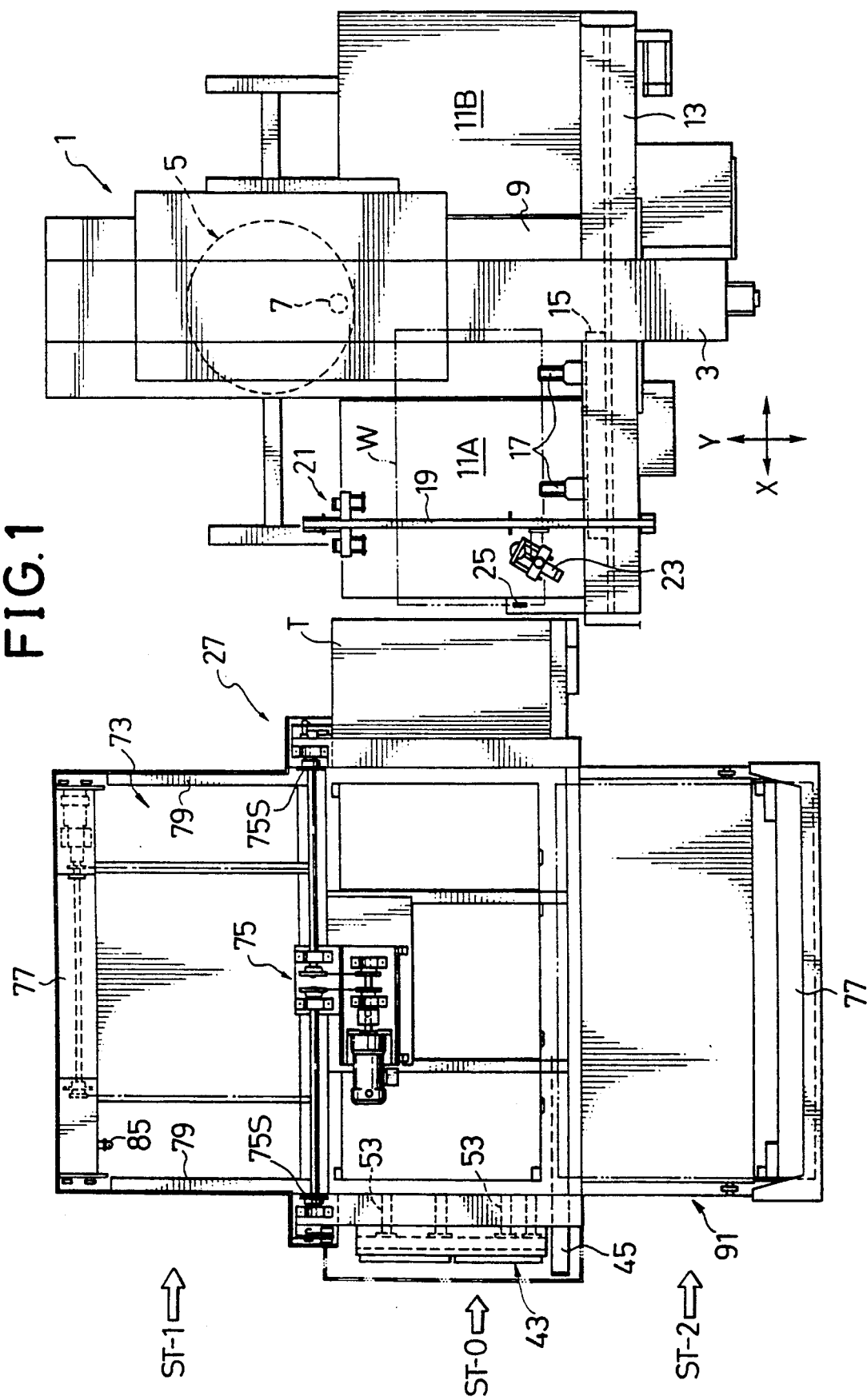
FIG. 1 is a plan drawing showing the positional relationship of a device of a first embodiment of the present invention and the plate processing machine.
Figure 2:
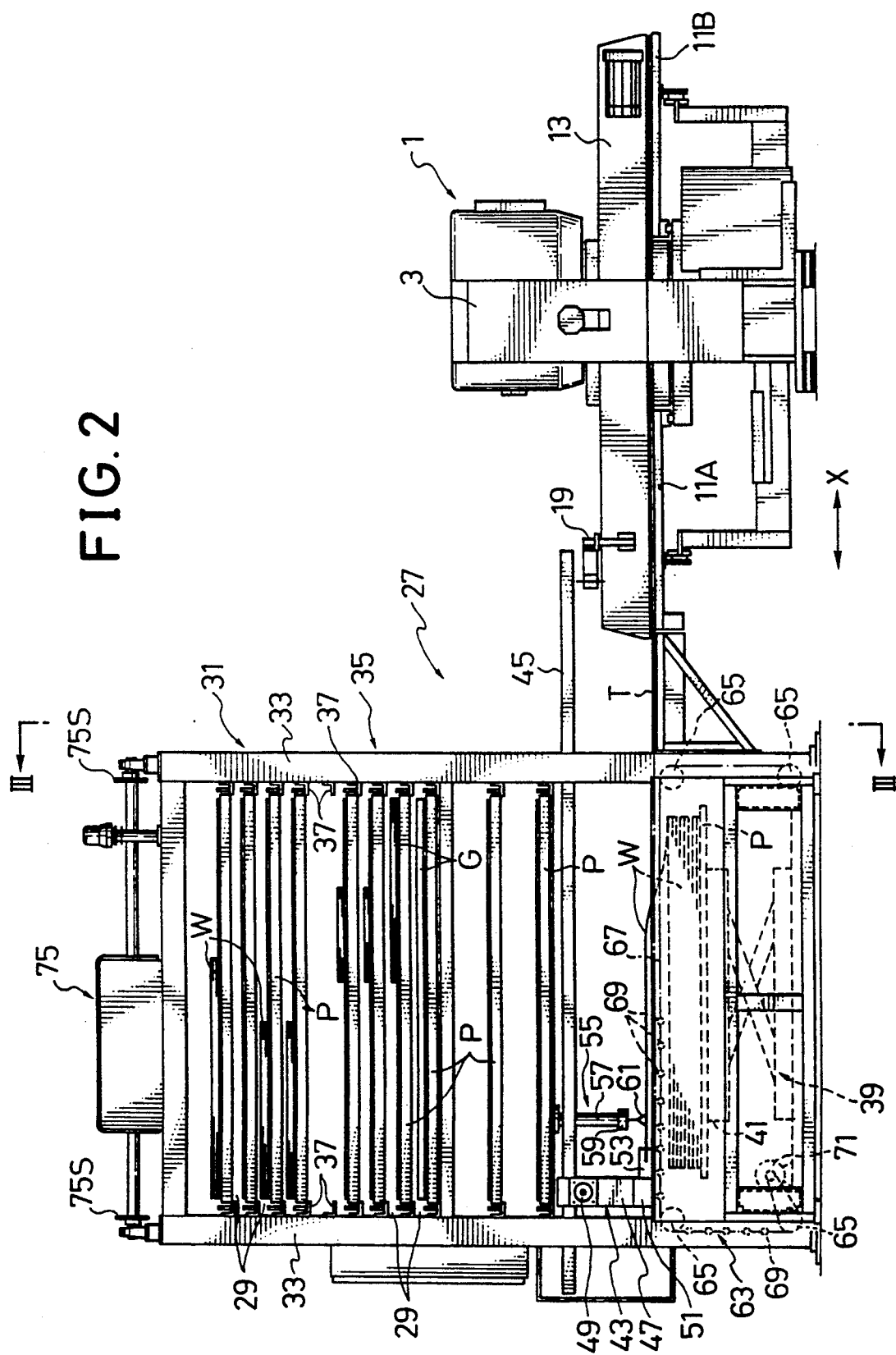
FIG. 2 is a front elevation of the device of FIG. 1.

Now referring to FIG. 1 and FIG. 2, a turret punch press is shown as an example of a plate processing machine 1 for processing a sheet workpiece W. The configuration of the turret punch press 1 used in this example is commonly known, but a general description will be given here. A frame 3 of the plate punch press 1 is provided in a C-shape or a gantry shape. A turret device 5 provided with an upper turret which supports a plurality of punches and a lower turret which supports a plurality of dies provided in vertical opposition on the frame 3 is horizontally mounted in a freely rotatable manner, and a striker 7 which strikes the positioned punch set at the processing position is provided in a manner allowing free mobility in the vertical direction.

In addition, on the right and left sides of a fixed table 9 secured to the frame body 3 of the turret punch press 1 a pair of movable tables 11A, 11B are provided, freely movable in the longitudinal direction (the Y-axis direction). The two movable tables 11A, 11B are integrally linked by means of a carriage base 13 extending in the lateral direction (the X-axis direction). On the carriage base 13, a carriage 15 is supported in a freely movable manner in the X-axis direction. A plurality of workpiece clamps 17 which clamp a workpiece W is mounted on the carriage 15.

A support bar 19 is provided on the carriage base 13 extending in the Y-axis direction above the movable table 11A. On the end of the support bar 19, a workpiece pusher 21, which contacts the workpiece W mounted on the fixed table 9 and movable table 11A and causes it to move toward the workpiece clamps 17, is supported in a freely movable manner in the Y-axis direction. In addition, a home-position positioning device 23 which can pick up the workpiece W and move in a direction intersecting the X- and Y-axes (to the lower left in FIG. 1) is provided on the base section side of the support bar 19. The home-position positioning device 23 moves the workpiece W in the direction intersecting the X- and Y-axes so that the workpiece W contacts the workpiece clamp 17, which is previously positioned at the home-position in the X-axis direction, and an X-axis home-position pin 25 provided in a freely extending and withdrawing manner with respect to the table surface at the X-axis end of the fixed table 11A, so that the workpiece W is positioned at the home-position.

The turret punch press of this configuration is, as previously stated, commonly known. Therefore, no further explanation of the configuration and use will be given.

Next, a workpiece loading and unloading device 27 by which the workpiece W is loaded into, and by which a finished product processed in the plate processing machine 1 is unloaded from the plate processing machine 1, such as a turret punch press or the like, will be explained in detail.

As can be clearly understood from FIG. 1 and FIG. 2, the workpiece loading and unloading device 27 is positioned at one side (the left side) of the plate processing machine 1. In the workpiece loading and unloading device 27, a workpiece storage device 31 is provided. In the workpiece storage device 31 a plurality of pallet storage shelves 29 (see FIG. 2 and FIG. 3) on which are stored a plurality of pallets P (material pallets) for carrying the workpiece W to be loaded into the plate processing machine 1, and a plurality of pallets P (finished product pallets) for carrying the processed finished product G, is provided in a plurality of vertical stages.

More specifically, the workpiece storage device 31 comprises a frame 35 which is formed by a plurality of erected, channel-shaped supporting bars 33, and a plurality of horizontal beam members for linking the supporting bars 33.

Figure 3:
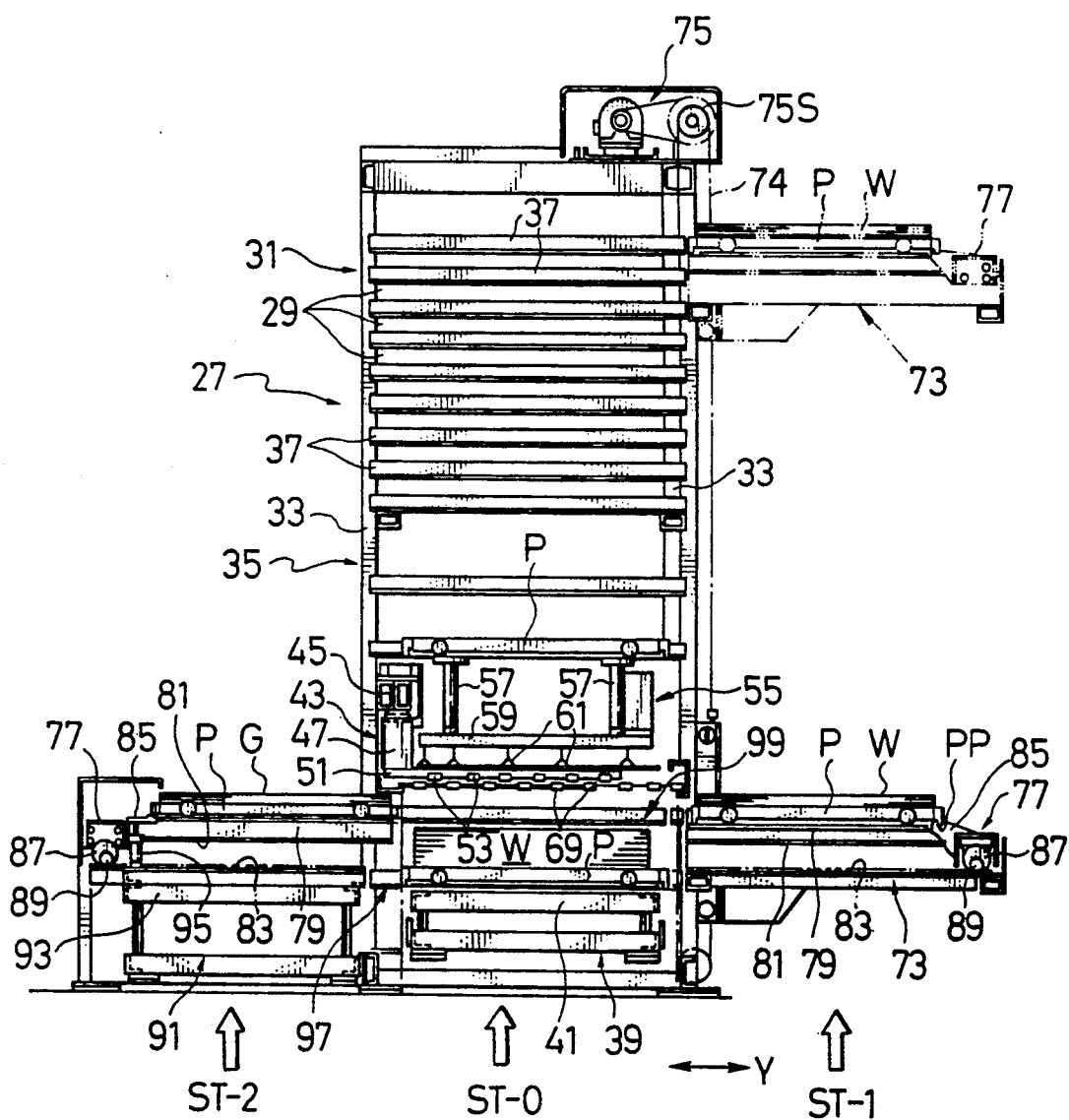
FIG. 3 is a sectional drawing taken along the lines III—III in FIG. 2.

As indicated in FIG. 2 and FIG. 3, a plurality of guide rails 37 with an L-shaped cross section is provided. The guide rails 37 are oppositely positioned on the inside of the frame 35 for supportingly guiding a plurality of wheels provided on both the left and right hand sides of each pallet P in FIG. 2. By the provision of these vertically arranged guide rails 37 the upper center section of the frame 35 is divided into a plurality of the pallet storage shelves 29 on which the pallets P are stored. In addition, in the frame 35, a loading and unloading station ST-0 (see FIG. 3 and FIG. 1) is provided as a region in which the workpiece W carried on the pallet P is loaded into the plate processing machine 1, and the finished product G processed in the plate processing machine 1 is conveyed to the pallet P.

Specifically, as shown in FIGS. 2 and 3, a first lifter device 39 which supports and elevates the pallet P is positioned at the loading and unloading station ST-0 at the bottom of the frame 35. The first lifter device 39 is provided with a pair of X-shaped links and supports a supporting table 41 horizontally. The links are moved by means of a hydraulic cylinder and the support table 41 is moved vertically. The structure of the first lifter device 39 is that of a conventional lifting device so a more detailed description is omitted.

A workpiece loading and unloading transfer device 43 is provided above the first lifter device 39 to remove the workpieces W carried on the pallet P supported on the first lifter device 39 and to load workpieces W to the plate processing machine 1, as well as to unload a finished product G from the plate processing machine 1 and convey the finished product G to the finished product pallet P supported on the first lifter device 39.

Specifically, as can be clearly understood by reference to FIG. 2 and FIG. 3, a support beam 45 extending to the top of the plate processing machine 1 is provided horizontally on one side of the inside of the frame 35. A transfer loader 47 is supported in a freely reciprocating manner on the support beam 45. The related details are omitted, but a motor 49 is mounted on the transfer loader 47 and a pinion (omitted from the drawings) rotated by the motor 49 engages a rack (omitted from the drawings) provided on the support beam 45.

Accordingly, by the forward or reverse rotation of the motor 49, it is possible to move the transfer loader 47 reciprocatingly in the X-axis direction (left and right in FIG. 2) along the support beam 45.

At the bottom of the transfer loader 47, as can be clearly understood by reference to FIGS. 2 and 3, a cantilever-type clamp holder 51 extending in the Y-axis direction (laterally in FIG. 3) is provided. A plurality of workpiece clamps 53 which clamp the end of the workpiece W is mounted on the clamp holder 51.

Accordingly, when the workpiece W is clamped by the workpiece clamps 53, the workpiece W can be conveyed and loaded into the plate processing machine 1 by moving the workpiece clamps 53 to the plate processing machine 1. In addition, after the finished product G obtained by processing the workpiece W in the plate processing machine 1 is clamped by the workpiece clamps 53, the finished product G can be unloaded and conveyed from the plate processing machine 1 by returning the workpiece clamps 53 to the original positions thereof.

As can be understood from the foregoing explanation, the workpiece loading and unloading transfer device 43 serves a double role as a loading device for loading the workpiece W into the plate processing machine 1 and as an unloading device for unloading the finished product G from the plate processing machine 1.

In order to remove the workpieces W one at a time from the pallet P on the first lifter device 39 in the loading and unloading station ST-0, a suction lifting device 55 which sucks the workpiece W at a position close to its end and lifts it, is provided on the loading and unloading station ST-0. Specifically, as shown in FIGS. 2 and 3, cylinder 57 are provided in the loading and unloading station ST-0 in a manner allowing free vertical movement on the frame 35. A plurality of suction pads 61 are suspended vertically from a pad holder 59 supported in a manner allowing free vertical movement on the cylinders 57.

Accordingly, the end of the workpiece W supported on the first lifter device 39 is picked up by the suction pads 61, and the pad holder 59 is caused to move vertically by the action of the cylinders 57. The workpiece W is therefore lifted and separated from the workpieces below it.

A slat conveyor 63 (see FIG. 2) is provided on the loading and unloading station ST-0 to horizontally support the workpiece W, which is lifted by the suction lifting device 55, while loading the workpiece W into or unloading it from the plate processing machine 1. The slat conveyor 63 comprises a pair of endless chains 67 which enclose a plurality of chain sprockets 65 supported in a freely rotatable manner on the frame 35, and a plurality of pipe rollers 69 supported on the endless chains 67 in a freely rotatable manner to separate the chains 67 by a suitable distance. The chains 67 are driven by a motor 71 mounted in a suitable position.

As a result of this configuration, after the end section of the workpiece W is secured and lifted by the suction lifting device 55, the chains 67 are driven in the clockwise direction in FIG. 2 by the motor 71, and when the pipe rollers 69 are positioned at the top side, the workpiece W is maintained horizontally by the pipe roller 69.

Accordingly, after one end of the workpiece W is clamped by the workpiece clamps 53 and the suction pads 61 are deenergized to release the workpiece, the transfer loader 47 moves to the right in FIG. 2, and the workpiece W is loaded into the plate processing machine 1 by the movement of the chains 67 in the clockwise direction.

Conversely, when the finished product G produced from the workpiece W in the plate processing machine 1 is clamped by the workpiece clamps 53 and moved to the left in FIG. 2, the finished product G is supported by the pipe rollers 69. Then, with one end of the finished product G clamped by the workpiece clamps 53, the chains 67 are driven in the counterclockwise direction in FIG. 2, and, by the movement of the pipe rollers 69 to a bottom position, the finished product G can be discharged and loaded onto the pallet P on the first lifter device 39.

In order to remove a suitable pallet P from the pallet storage shelves 29 of the workpiece storage device 31 and move this pallet P onto the first lifter device 39, or, in order to store the pallet P from the first lifter device 39 on the pallet storage shelves 29, an elevator device 73 is provided in a freely elevatable manner on a first station ST-1 provided on the Y-axis direction side of the loading and unloading station ST-0.

More specifically, the elevator device 73 moves vertically, guided by a vertical guide rail (omitted from the drawing) provided on the supporting bars 33 of the frame 35. A pair of chains 74, which enclose a pair of sprockets 75S on a winch device 75 mounted on the upper section of the frame 35, are connected to the elevator device 73.

In this configuration, by driving the winch device 75 the elevator device 73 can be suitably elevated and positioned at a height corresponding to the respective pallet storage shelves 29, and can be positioned at a height for the forwarding and withdrawing of the pallet P with respect to the first lifter device 39.

In order to carry out the forwarding and withdrawing of the pallet P with respect to the pallet storage shelves 29 and the first lifter device 39, a pallet transfer device 77 is provided on the elevator device 73 in a manner allowing free reciprocating movement in the lateral direction in FIG. 3.

More specifically a pair of guide rails 79, which have the same width as guide rails 37 on the pallet storage shelves 29, are provided horizontally on the elevator device 73 to support the pallet P. In addition, a pair of guide rails 81 which guide the pallet transfer device 77 and a rack 83 are horizontally provided on the elevator device 73. An engaging extension section PP on the end of the pallet P, an engaging hook member 85 provided in a manner allowing free vertical movement, and a motor 87 are provided on the pallet transfer device 77. A pinion 89 rotated by the motor 87 engages the rack 83.

As a result of this configuration, the pallet transfer device 77 is moved in the lateral direction in FIG. 3 when the motor 87 is driven. When the engaging hook member 85 moves in engagement with the engaging extension part PP of the pallet P, the pallet P can be conveyed onto or withdrawn from the pallet storage shelves 29 or the first lifter device 39.

A second lifter device 91 is positioned in a manner allowing free vertical movement on a second station ST-2 provided on the other side of the loading and unloading station ST-0 to temporarily remove the pallet P previously supported on the first lifter device 39 when another pallet P is conveyed from the elevator device 73 to the position of the first lifter device 39.

The second lifter device 91 moves vertically, utilizing the same type of configuration as the first lifter device 39. On a support table 93 which has free vertical movement on the second lifter device 91, a device of the same configuration as the pallet transfer device 77 is provided on the elevator device 73, to convey the pallet P to or to withdraw the pallet P from the first lifter device 39.

Accordingly, because the same explanation applies, the same reference number is applied to the same structural members of the second lifter device 91 as those of the elevator device 73, and a detailed explanation is omitted. Further, a minicylinder 95 is provided for vertical movement of the engaging hook member 85.

In a configuration such as this, first the elevator device 73 is raised to a suitable height at the pallet storage shelves 29, and an empty pallet P is removed from the pallet storage shelves 29 and lowered to the lowest position. When the elevator device 73 is positioned at the lowest position, the height of the guide rails 79 on the elevator device 73 corresponds to the height of a pair of lower guide rails 97 (see FIG. 3) on the loading and unloading station ST-0.

Accordingly, by lowering the support table 41 of the first lifter device 39 to a position below the lower guide rails 97, the pallet P can be transferred from the elevator device 73 onto the lower guide rails 97.

When the pallet P has been transferred onto the lower guide rails 97 in this manner, the second lifter device 91 on the second station ST-2 is lowered, and the empty pallet P is drawn onto the guide rails 79 of the second lifter device 91.

As outlined above, after the empty pallet P is transferred from the elevator device 73 onto the lower guide rails 97 of the loading and unloading station ST-0, the elevator device 73 is raised and positioned at a height corresponding to an optionally selected pallet storage shelf 29. The pallet P on which the workpiece W is carried (hereinafter referred to as the material pallet P) is drawn out from the pallet storage shelves 29, and is lowered to the lowest position as outlined above. The material pallet P is then transferred to the lower guide rails 97.

When the material pallet P has been transferred to the lower guide rails 97 as outlined above, the first lifter device 39 is suitably raised and the material pallet P is pushed up so that the highest part of the workpiece W on the material pallet P is positioned at a specified height.

When the material pallet P has been pushed up to the specified height, the suction pads 61 on the suction lifting device 55 are lowered and one end at the highest part of the workpiece W is secured and lifted up. When the end of the workpiece W has been lifted up by the suction lifting device 55, the slat conveyor 63 is moved to the upper side so that the workpiece W is supported by the pipe rollers 69. When the workpiece W is supported horizontally by the slat conveyor 63, the workpiece clamp 53 on the workpiece loading and unloading transfer device 43 is moved close to the end of the workpiece W and clamps the end of the workpiece W. After the end of the workpiece W has been clamped by the workpiece clamp 53 on the workpiece loading and unloading transfer device 43 as described, the workpiece W can be loaded onto the movable table 11A of the plate processing machine 1 by moving only the workpiece loading and unloading transfer device 43 or by moving both the workpiece loading and unloading transfer device 43 and the slat conveyor 63.

After the workpiece W is loaded on the movable table 11A, the workpiece W is positioned at the home position of the plate processing machine 1 by the action of the workpiece pusher 21 and the home position positioning device 23, and is clamped by the workpiece clamp 17 on the plate processing machine 1. Then the workpiece W is moved and positioned in the X-axis and Y-axis directions and suitable processing is carried out.

After the workpiece W has been loaded to the plate processing machine 1 as described above, the workpiece loading and unloading transfer device 43 is held at the position above an intermediate table T (see FIG. 1 and FIG. 2) positioned between the plate processing machine 1 and the workpiece loading and unloading device 27.

In addition, while the workpiece W is being processed in the plate processing machine 1, the material pallet P at the loading and unloading station ST-0 is pulled back onto the elevator device 73 of the first station ST-1, and the empty pallet P supported on the support table 93 of the second lifter device 91 (hereinafter referred to as the finished product pallet P) is moved onto the support guide rails 99 (see FIG. 3) or the lower guide rails 97 of the loading and unloading station ST-0.

When the processing of the workpiece W in the plate processing machine 1 has been completed, the workpiece loading and unloading transfer device 43 which is being held above the intermediate table T is moved to the plate processing machine 1. After one end of the processed finished product G is clamped by the workpiece clamp 53, the finished product G is unloaded from the plate processing machine 1.

When the workpiece loading and unloading transfer device 43 has clamped the finished product G and returned to its original position, the workpiece W is supported horizontally on the pipe rollers 69 of the slat conveyor 63 above the finished product pallet P. Accordingly, the pipe rollers 69 on the slat conveyor 63 are moved to a bottom position and the upper part of the finished product pallet P is left open, and by releasing the workpiece clamp 53 the finished product G can be loaded onto the finished product pallet P.

After the finished product G is loaded onto the finished product pallet P, as outlined above, the finished product pallet P is once again returned to the second lifter device 91 of the second station ST-2, and the material pallet P on the elevator device 73 of the first station ST-1 is once again returned to the loading and unloading station ST-0. The loading and unloading of the workpiece W to the plate processing machine 1 is then resumed.

Specifically, the material pallet P is positioned between the loading and unloading station ST-0 and the first station ST-1; the finished product pallet P is positioned between the loading and unloading station ST-0 and the second station ST-2. The loading of the workpiece W to the plate processing machine 1 and the unloading of the finished product G from the plate processing machine 1 are alternately repeated.

Then, after there are no more workpieces W on the material pallet P and all the finished products G have been loaded onto the finished product pallet P, the finished product pallet P is transported to the elevator device 73 via the upper guide rails 99, the elevator device 73 is elevated, and the finished product pallet P is stored on the empty pallet storage shelves 29. Then the emptied material pallet P is transported onto the second lifter device 91 and becomes the next finished product pallet P.

The next material pallet P which bears the next workpiece W to be processed is removed from the pallet storage shelves 29 by the elevator device 73, and, as previously described, is conveyed to the position of the lower guide rails 97 of the loading and unloading station ST-0. Then, as previously described, the subsequent workpieces W previously stored on the pallet storage shelves 29 in the workpiece storage device 31 can be processed.

Specifically, by this embodiment of the present invention, the workpiece loading and unloading device 27 can be positioned on one side of the plate processing machine 1 and can occupy a comparatively small area. In addition, the workpieces W of various sizes and shapes can be processed successively; the processed finished products can be stored; and unmanned, multiproduct, small number production runs can be handled.

Figure 4:
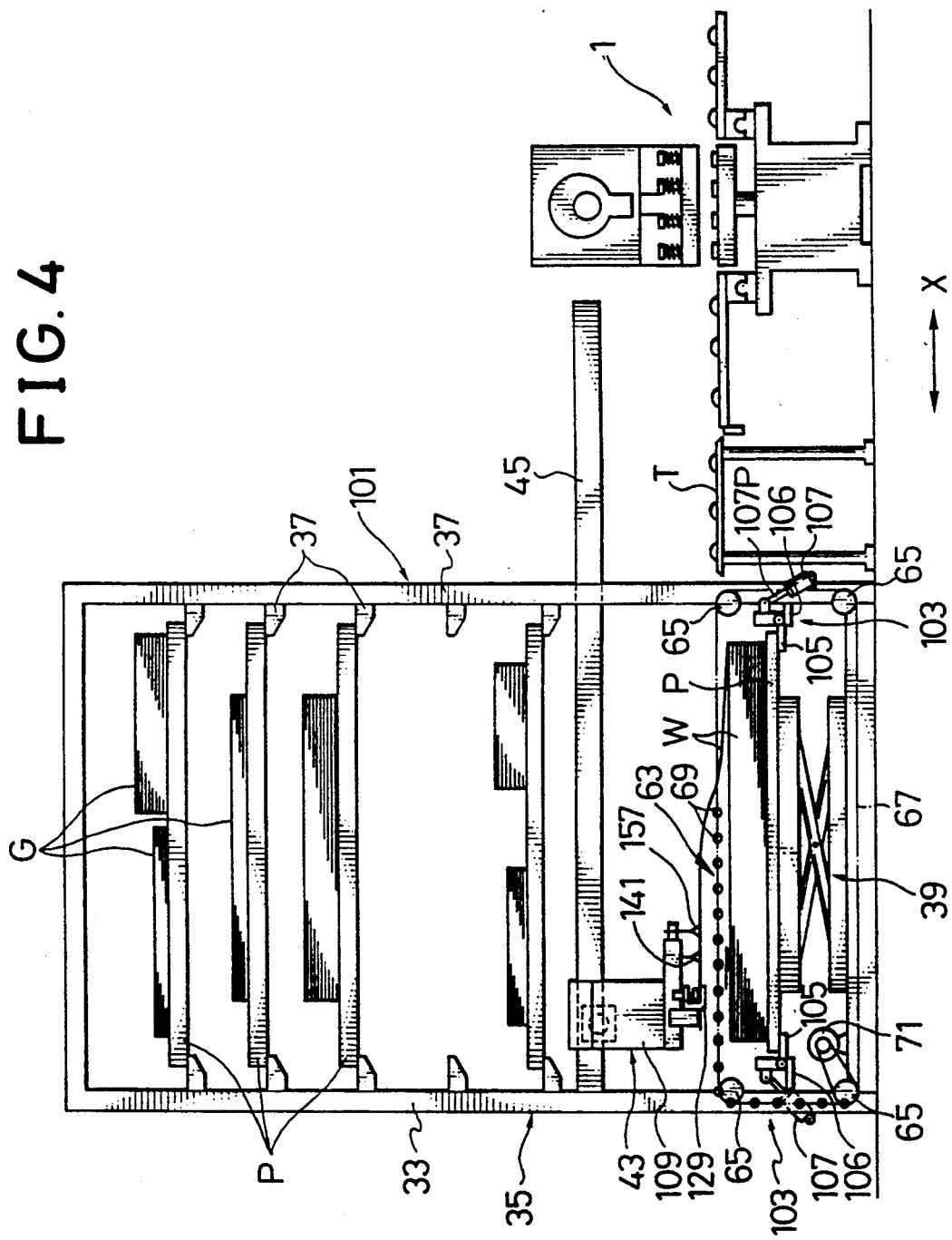
FIG. 4 is a general front elevation showing a second embodiment of the device of the present invention.
Figure 5:
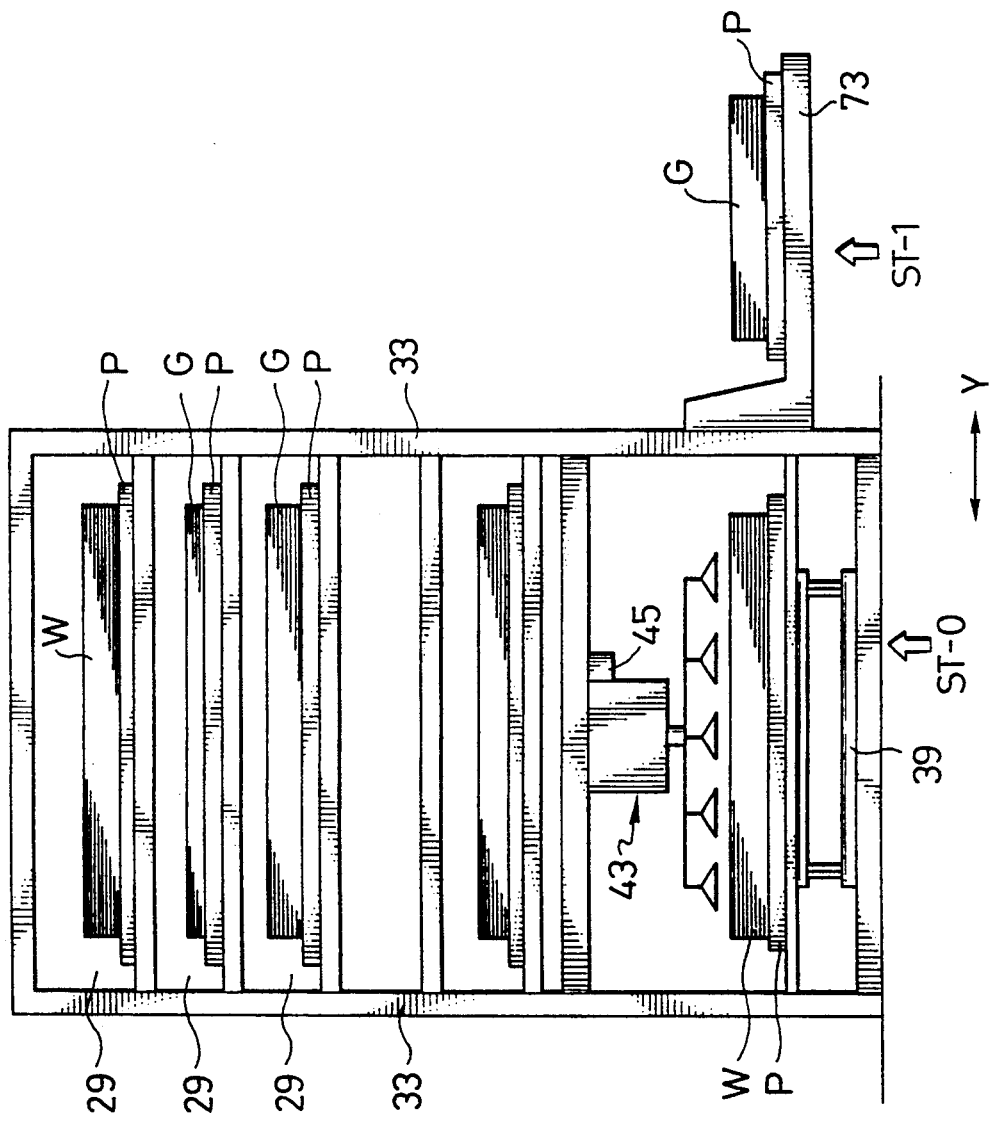
FIG. 5 is a right side elevation of the device of FIG. 4.

A second embodiment of a workpiece loading and unloading device of the present invention is generally shown in FIG. 4 and FIG. 5. The main differences between a workpiece loading and unloading device 101 of this second embodiment and the workpiece loading and unloading device 27 of the first embodiment are the omission of a second station and the provision of a pallet support device 103 which supports the pallet P in the loading and unloading station ST-0. The pallet support device 103 is provided in a freely positional variable manner in both a supporting position which supports the pallet P and a non-supporting position which permits vertical movement of the pallet P and does not support the pallet P.

Further, the other structures have the same functions as the structural members in the workpiece loading and unloading device 27 of the first embodiment, so that the same general relationship in FIG. 4 and FIG. 5 and the same reference numbers have been applied to structural members which have the same function as in the workpiece loading and unloading device 27 shown in the first embodiment. A further detailed explanation is therefore omitted.

The pallet support device 103 is provided with a pallet guide member 105 in a freely vertically rotatable manner, which member 105 guidingly supports the pallet P conveyed to the loading and unloading station ST-0 from the elevator device 73 of the first station ST-1.

More specifically, the pallet guide member 105 is supported in a freely vertically rotatable manner through a pivot on a bracket 106 mounted on the frame 35. In order to vertically rotate the pallet guide member 105 the end section of a piston rod 107P of a cylinder 107 mounted on the frame 35 is pivotally linked to the pallet guide member 105.

Accordingly, from the action of the cylinder 107, the pallet guide member 105 changes its position to both the supporting position which supports the pallet P and to the almost perpendicular non-supporting position which does not support the pallet P.

In the second embodiment of the present invention, after the material pallet P, for example, is supported on the lifter device 39, and the material pallet P is raised up to a position at a specified height by the lifter device 39, and the uppermost workpiece W is delivered to the workpiece loading and unloading transfer device 43, the pallet guide member 105 is positioned at an almost vertical non-supporting position, and the material pallet P is lowered to a lower position than the pallet guide member 105.

While the workpiece W is being conveyed to the plate processing machine 1 by the workpiece loading and unloading transfer device 43 and processed, the pallet guide member 105 changes to the horizontal supporting position, and the finished product pallet P is conveyed from the elevator device 73 at the first station ST-1 onto the pallet guide member 105 and maintained at that position.

The finished product G which has been processed in the plate processing machine 1 is then unloaded from the plate processing machine 1 by the workpiece loading and unloading transfer device 43 and loaded onto the finished product pallet P.

After the finished product G has been loaded onto the finished product pallet P, the finished product pallet P is returned to the elevator device 73, the pallet guide member 105 is positioned in the almost vertical non-supporting position, and the material pallet P is once again elevated by the lifter device 39. The workpiece W is then loaded into the plate processing machine 1 by the workpiece loading and unloading transfer device 43 as before, and the processing cycle is repeated.

Then, after no more workpieces W remain on the material pallet P and all the finished products G have been loaded onto the finished product pallet P, the finished product pallet P is stored on a suitable pallet storage shelf 29 by the elevator device 73. Also, after the emptied material pallet P is transported to the elevator device 73, and is stored on a suitable pallet storage shelf 29, the next material pallet P bearing the next workpiece W for processing is optionally selected and removed from the pallet storage shelves 29 by the elevator device 73. After the material pallet P is delivered to the lifter device 39, an empty pallet P is removed from the elevator device 73 and becomes the next finished product pallet. Therefore, the workpieces W of various sizes and shapes previously stored in the workpiece storage device 31 can be processed successively.

Specifically, the same advantages are obtained by the device of the second embodiment of the present invention as obtained by the device of the first embodiment.

In the foregoing explanation of the second embodiment of the present invention the lifter device 39 handles the material pallets and the elevator device 73 handles the finished product pallets. However, these functions of the devices 39 and 73 can be effectively reversed.

Figure 6:
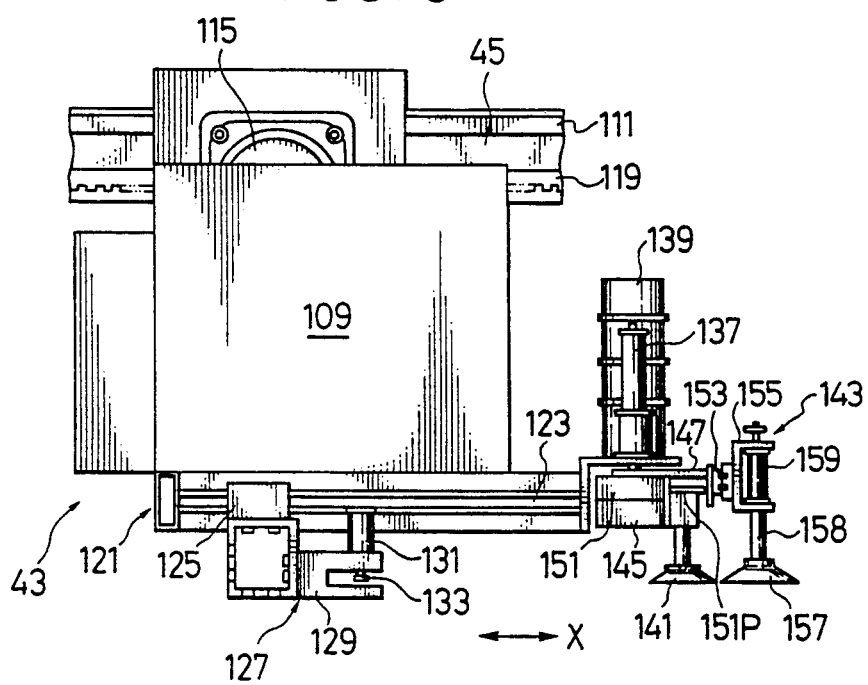
FIG. 6 is a front elevation of a workpiece loading and unloading device for the plate processing machine.
Figure 7:
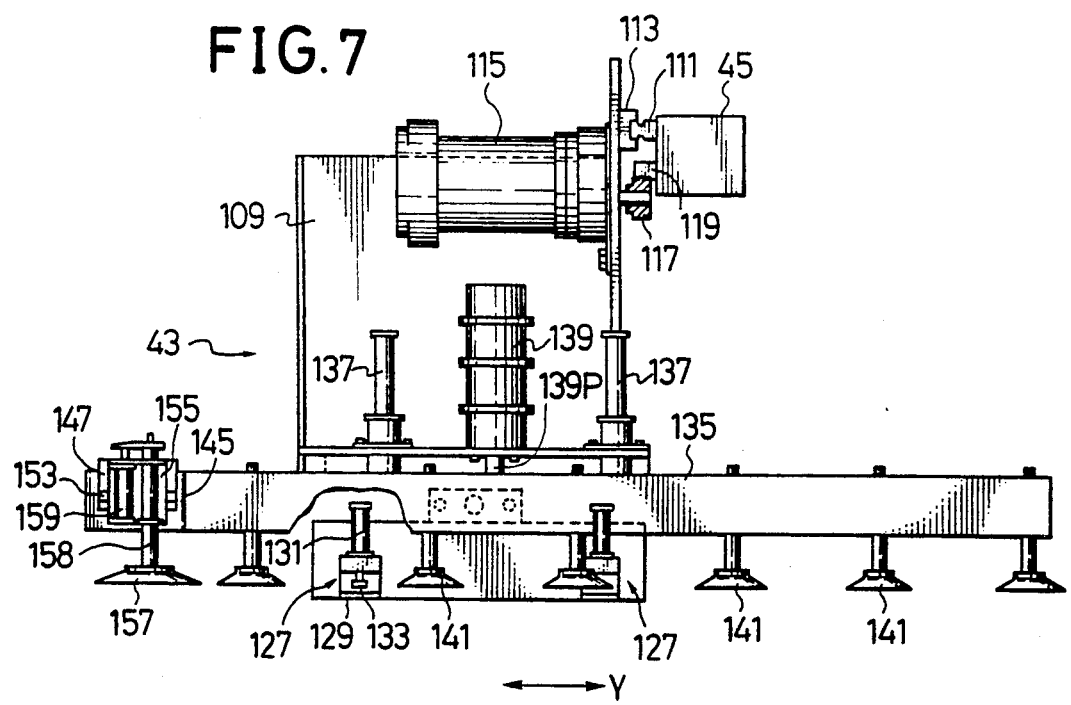
FIG. 7 is a right side elevation of the device of FIG. 6.
Figure 8:
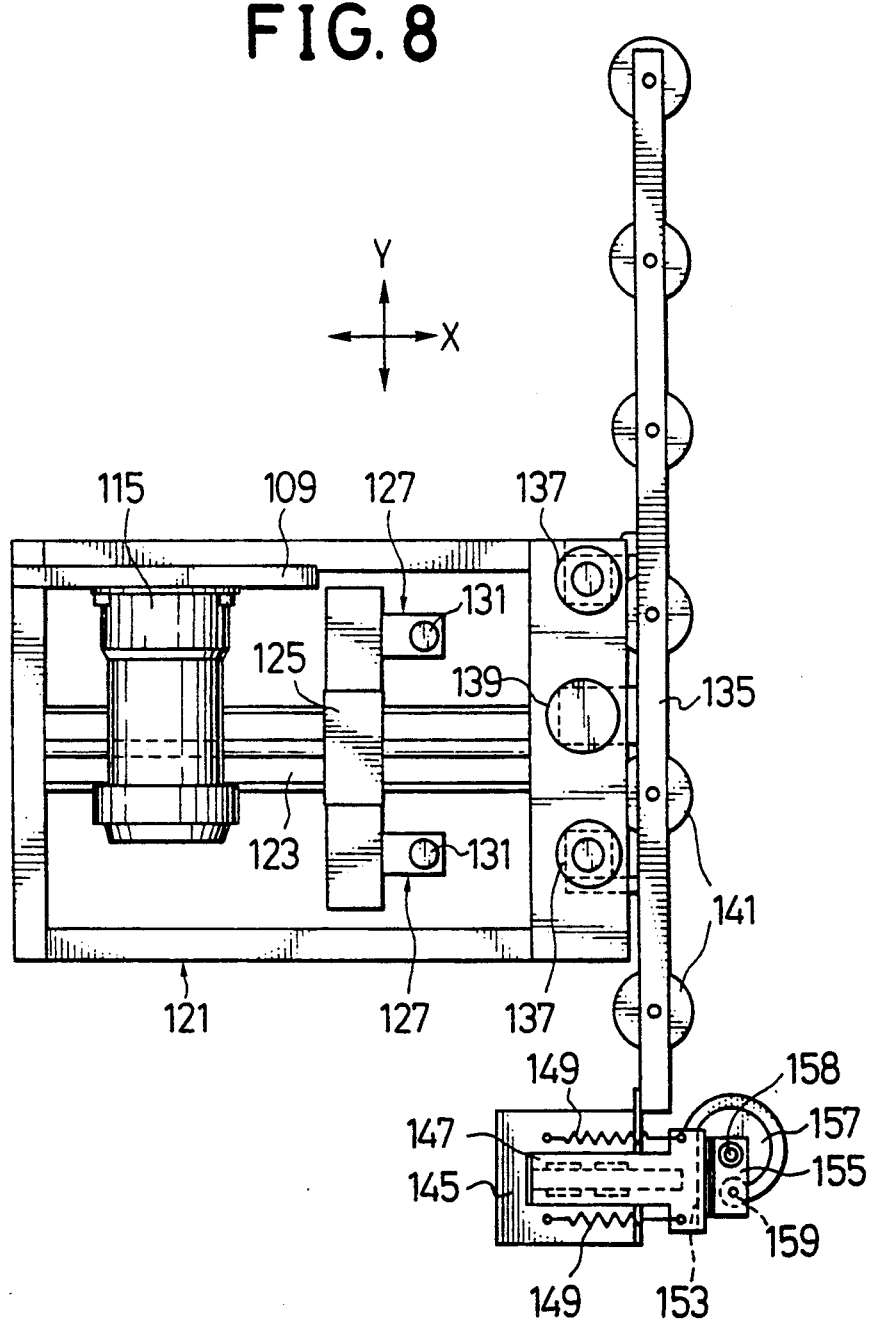
FIG. 8 is a plan view of the device of FIG. 6.

FIG. 6, FIG. 7, and FIG. 8 show details of the workpiece loading and unloading transfer device 43 and the workpiece loading and unloading device 101 for the second embodiment.

A transfer loader 109 on the workpiece loading and unloading transfer device 43 is supported in a freely movable manner in the X-axis direction through a slider 113 on a guide rail 111 provided on the beam member 45. A pinion 117 which is rotated by a motor 115 mounted on the transfer loader 109 engages a rack 119 provided parallel to the guide rail 111.

A support frame body 121 is provided at the bottom of the transfer loader 109. A rodless cylinder 123 running parallel to the direction of motion of the transfer loader 109 is provided on the support frame body 121. A workpiece clamp 127 which clamps the end of the workpiece W is provided on a reciprocating action body 125 which is guidedly moved in the X-axis direction by the rodless cylinder 123.

The workpiece clamp 127 comprises a minicylinder 131 and a pressure pad 133 provided on a clamp jaw 129 which clamps the workpiece W. The pressure pad 133 is moved vertically by the minicylinder 131.

In addition, a pad holder 135 which extends in a direction at right angles to the direction of motion of the transfer loader 109 is supported in a manner allowing free vertical motion through a plurality of guide members 137 on the end of the support frame body 121. A piston rod 139P of an elevating piston 139 mounted on the support frame body 121 is linked to the pad holder 135.

A plurality of suction pads 141 which suck and lift the workpiece W is supported on the pad holder 135 in a manner allowing free vertical motion. A home position positioning transfer device 143 for positioning the workpiece W at the home position in the plate processing machine 1 is mounted on the end of the pad holder 135.

More specifically, a first slide member 147 is supported in a cylinder housing 145 provided on one end of the pad holder 135. The first slide member 147 is unidirectionally energized by a spring 149 installed between first slide member 147 and the cylinder housing 145 to move the first slide member 147 in the X-axis direction, parallel to the direction of motion of the transfer loader 109. In addition, the end of a piston rod 151P of a cylinder 151 which is built into the cylinder housing 145 contacts the first slide member 147 to move the first slide member 147 while opposing the resistance of the spring 149.

A guide section 153 is formed on the nd of the first slide member 147 in the Y-axis direction at right angles to the direction of motion of the first slide member 147. A second slide member 155 is supported on the guide section 153 in a manner allowing free movement in the Y-axis direction. Then, an elevating rod 158 which supports the bottom end of a suction pad 157 for securing and positioning the workpiece W at the home position is supported in a manner allowing free vertical movement on the second slide member 155. A vertical movement cylinder 159 is provided for moving the suction pad 157 vertically. The piston rod of the vertical movement cylinder 159 and the elevating rod 158 are suitably linked.

As a result of this configuration, the workpiece loading and unloading transfer device 43 can secure the workpiece W at a point close to the end thereof and raise it by means of the suction pads 141. Then, from the action of the rodless cylinder 123, the workpiece clamp 127 can be brought close to the end of the workpiece W which has been raised by the suction pads 141 so that the workpiece clamp 127 can clamp the end of the workpiece W. Accordingly, even in the case where, for example, a hole or the like is processed close to the end of the finished product in the plate processing machine 1, and suction by the suction pads may be difficult, the unloading of the finished product can be easily accomplished. The device of the present invention can be used to both load the workpiece W to the plate processing machine 1 and unload the finished product G from the plate processing machine 1 after processing.

In addition, after the workpiece W is loaded to the plate processing machine 1, the suction pad 157 can be pulled in the X-axis direction by the spring 149 when the workpiece W is sucked by the suction pad 157 for positioning the workpiece W at the home position, and because motion in the Y-axis direction is permitted it is easy to cope with the positioning of the workpiece at the home position in the plate processing machine (the positioning of the workpiece in Y-axis direction may be performed by the pusher 21 of the plate processing machine).

Figure 9:
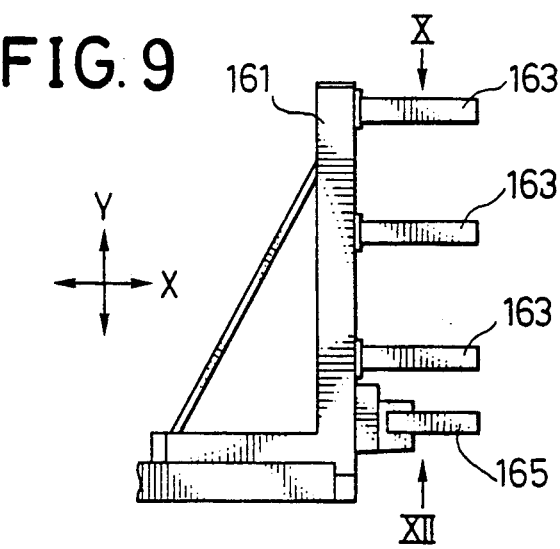
FIG. 9 is a schematic plan view of a clamping device for loading a workpiece to and unloading a workpiece from the plate processing machine.

FIG. 9 is a general view of another embodiment of the workpiece loading and unloading transfer device 43. In this embodiment, a plurality of workpiece clamps 163 and a workpiece clamp home position positioning device 165 are provided on a clamp holder 161.

As shown in detail in FIG. 10 and FIG. 11, the workpiece clamp 163 is supported in a manner allowing it to swing vertically on the clamp holder 161.

Specifically, the base side of a clamp body 169 with a U-shaped cross section is supported in a freely vertical swinging manner by a trunnion shaft 170 between a pair of L-shaped brackets 167 secured to the clamp holder 161. A lower clamp jaw 171 is secured to the end of the clamp body 169, and a bell crank-shaped upper clamp jaw 173 is pivotally supported in a freely vertically rotatable manner on the upper side of the lower clamp jaw 171 through a pivot 175. A clamp member 177 with a semicircular cross sectional shape is mounted on the end of the upper clamp jaw 173. In addition, the end of the piston rod 179P on the clamp cylinder 179 which is pivotally supported on the trunnion shaft 170 is pivotally linked to the other side of the upper clamp jaw 173.

A balance spring 185 is installed between a spring seat 181 provided on the base side of the clamp body 169 and a spring seat 183 provided on the bracket 167. A spring guide 187 inside the balance spring 185 is provided in a manner allowing free vertical movement with respect to the spring seat 183.

By means of this configuration, the workpiece clamp 163 balances the bias force of the balance spring 185 and is maintained in an almost horizontal position. When the workpiece W is clamped between the bottom clamp jaw 171 and the clamp member 177, the workpiece clamp 163 inclines so that the end thereof is lowered resisting the balance spring 185. Accordingly, the workpiece clamp 163 is parallel to the end section of the workpiece W which is inclined due to the weight of the workpiece, and prevents the end of the workpiece W from being bent.

Figure 12:
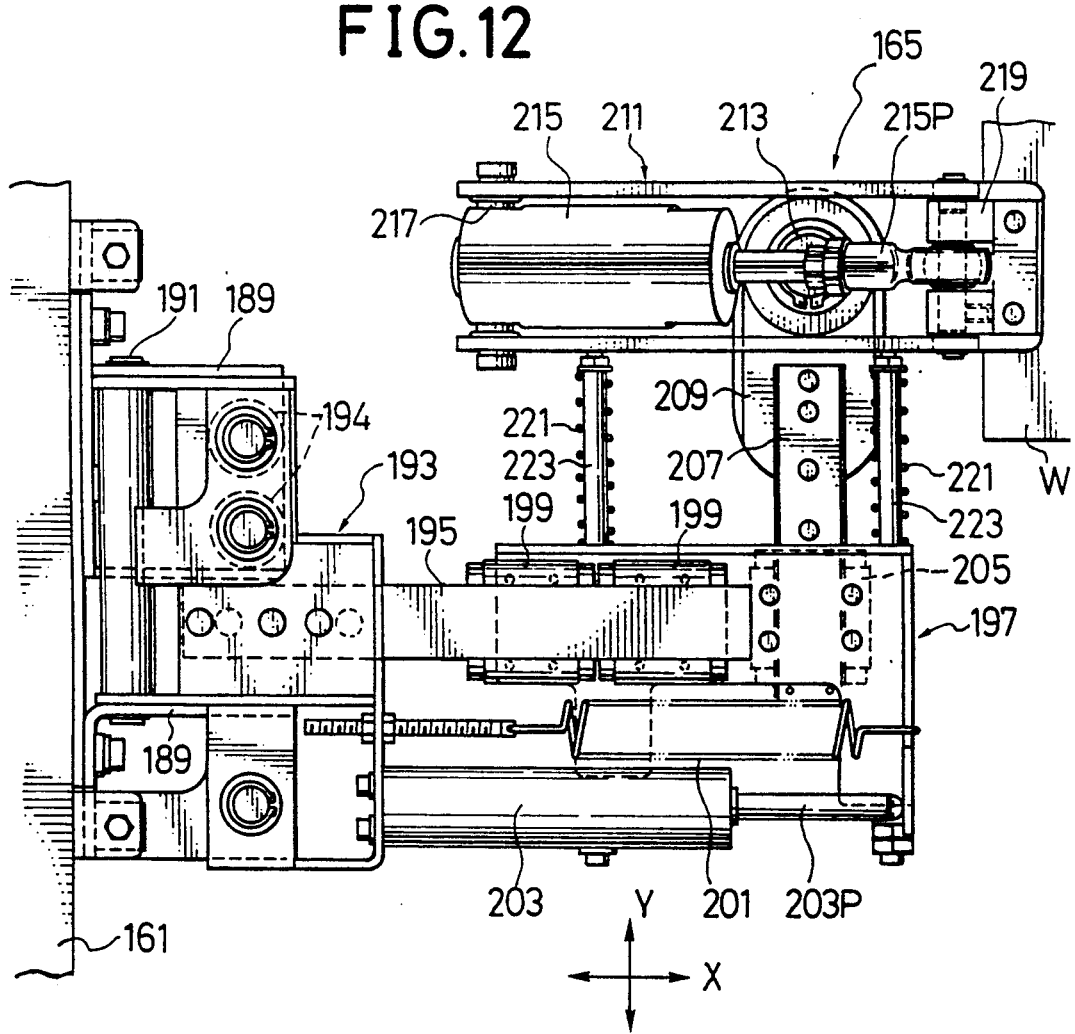
FIG. 12 is a detailed plan view of the part indicated by the arrow XII in FIG. 9.

Now referring to FIG. 12, the workpiece clamp home-position positioning device 165 is provided in a manner allowing free swinging in the vertical direction relative to the clamp holder 161, free movement in the X-axis and Y-axis directions, and free rotation in the horizontal plane.

Specifically, a swinging bracket 193 is supported in a freely vertically swinging manner through a pivot 191 on a pair of brackets 189 mounted on the clamp holder 161. A plurality of balance springs 194 is installed in the same manner as the balance spring 185 between the swinging bracket 193 and the bracket 189. The swinging bracket 193 is normally energized upward.

An X-axis guide 195 extending in the X-axis direction is secured to the swinging bracket 193. An X-axis slider 197 is supported in a freely movable manner on the X-axis guide 195 through a slider 199. A coil spring 201 is installed between the X-axis slider 197 and the swinging bracket 193. In addition, the end of a piston rod 203P on a cylinder 203 which moves the X-axis slider 197, contacts the X-axis slider 197 biased to the left in FIG. 12 by the coil spring 201.

A Y-axis direction guide block 205 is mounted on the X-axis slider 197. A Y-axis slider 207 which extends in the Y-axis direction is supported in a freely slidable manner on the guide block 205. An oval base plate 209 is mounted on the end of the Y-axis slider 207. A freely rotatable clamp body 211 for the workpiece clamp 165 is supported horizontally on the base plate 209 through a pivot 213.

The base of a clamp cylinder 215 is pivotally supported on the clamp body 211 through a trunnion shaft 217. The end of a piston rod 215P of the clamp cylinder 215 is pivotally linked to a bell crank-shaped upper clamp jaw 219. In addition, a plurality of slide rods 223 is provided, supported on the X-axis slider 197 slidable in the Y-axis direction and biased in the direction of the workpiece clamp 165 by a spring 221. The ends of the slide rods 223 are in contact with the clamp body 211 to restrain easily rotation.

As is readily understood from the foregoing explanation, the workpiece clamp 165 can be moved vertically to be positioned parallel to the inclined end of the workpiece W, and the workpiece W can move in the X-axis direction from the action of the coil spring 201. Further, the workpiece clamp 165 can move in the Y-axis direction, and can also rotate horizontally. Therefore, when the workpiece W loaded to the plate processing machine 1 can move in the X-axis, Y-axis directions and is positioned at the home position, it is easy to cope with the case where the workpiece is inclined relative to the X-axis and the Y-axis, and the workpiece can easily be positioned at the home position.

Figure 13:
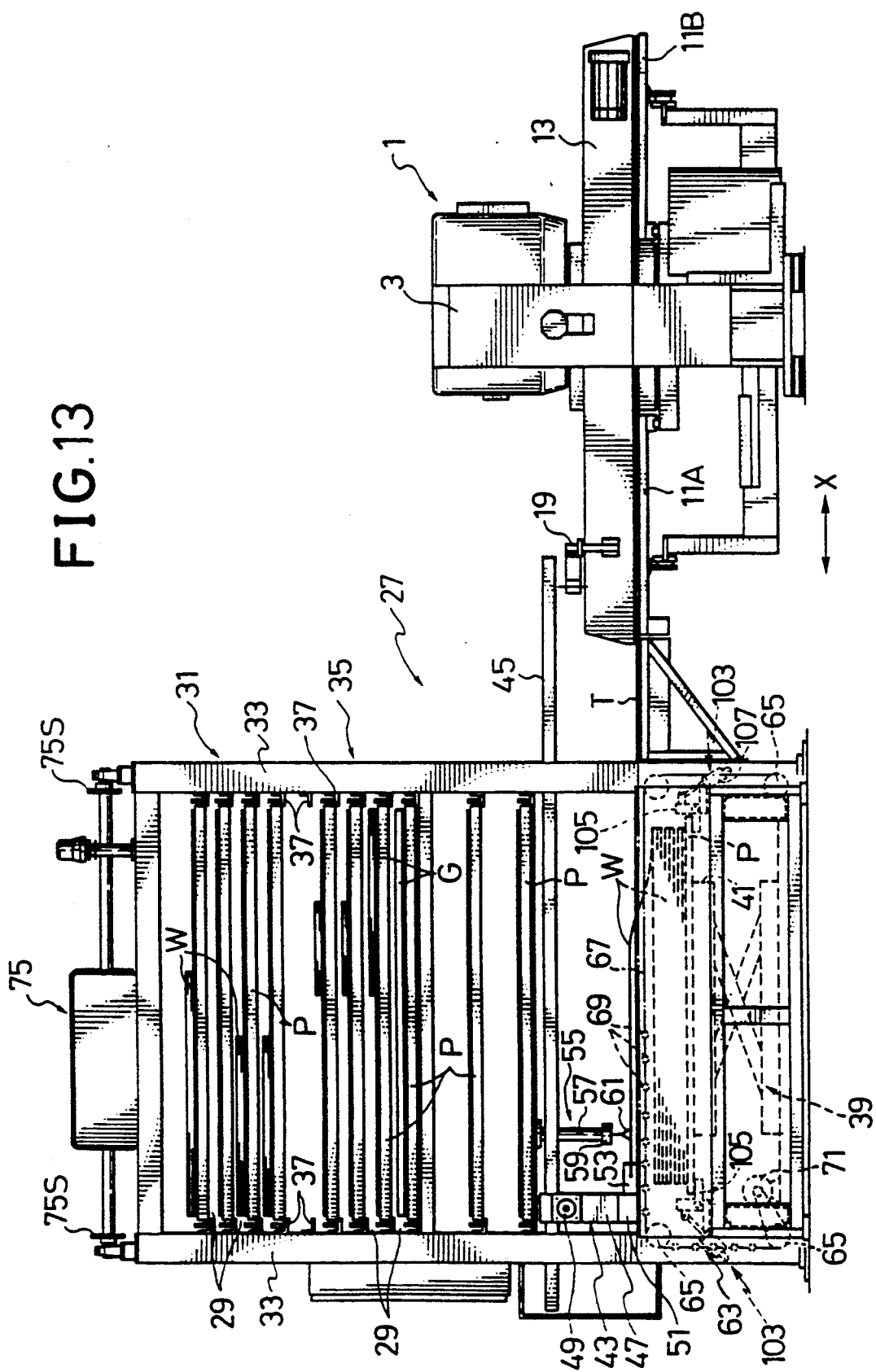

FIG. 13 shows a third embodiment of the present invention. In the configuration of this third embodiment, the pallet support device 103 of the second embodiment shown in FIG. 4 and FIG. 5 has been added to the loading and unloading station ST-0 in the device of the first embodiment illustrated in FIG. 1 to FIG. 3. Accordingly, because all the structural members which have the same functions as the structural members in the first and second embodiments have been assigned the same reference numbers, a further detailed explanation is omitted.

In the third embodiment, the material pallet P or the finished product pallet P is supported by the pallet support device 103 or the first lifter device 39. The material pallet P or the finished product pallet P moves reciprocatingly between the second lifter device 91 of the second station ST-2 and the pallet support device 103 to load the workpiece W into the plate processing machine 1 or to unload the processed finished product therefrom, respectively.

Specifically, after the workpiece W is removed from the material pallet P supported by the pallet support device 103 (or on the elevated first lifter device 39) and loaded into the plate processing machine 1, the material pallet P on the pallet support device 103 is transferred to the second lifter device 91 of the second station ST-2 (or the first lifter device 39 is lowered and the material pallet P is lowered by the pallet support device 103).

Next, the first lifter device 39 is elevated and the supported finished product pallet P is elevated to a position higher than the pallet support device 103 (or the finished product pallet P is transferred onto the pallet support device 103 from the second lifter device 91). The finished product G which has been processed in the plate processing machine 1 is then unloaded and piled onto the finished product pallet P.

The pallet is transferred between the loading and unloading station ST-0 and the second station ST-2 in this manner. While the workpiece W is being loaded into the plate processing machine 1 and the processed finished product G is unloaded therefrom, the elevator device 73 of the first station ST-1 is utilized to supply another material pallet P to the pallet storage shelves 29 or to remove the finished product pallet P from the pallet storage shelves 29.

Specifically, in the third embodiment of the present invention, the elevator device 73 can be used for another service during the processing of the workpiece W.

As can be understood from the foregoing explanation of the embodiments of the present invention, the workpiece loading and unloading device of the present invention is positioned at one side of the plate processing machine, and has a simple configuration by which the workpiece is loaded into, and unloaded from the plate processing machine, so that various types of workpieces and finished products can be classified and stored. Therefore, unmanned, multiproduct, small number production runs can easily be carried out.

In addition, in the device of the present invention the workpiece clamp can load the workpiece to and unload the finished product from the plate processing machine, and can also easily position the workpiece at the home position in the plate processing machine.

Furthermore, when the end of the workpiece is clamped and lifted, the workpiece clamp can follow the inclination of the end of the workpiece so that the end of the workpiece does not bend.

What is claimed is:

1. A method of loading a sheet workpiece into and of unloading a finished product from a plate processing machine, comprising the steps of:

providing on one side of the plate processing machine which processes the sheet workpiece, a loading and unloading station where an operation of loading the workpiece into and unloading a finished product from the plate processing machine is performed, said loading and unloading station having first and second sides;

providing a first station on the first side of the loading and unloading station and a second station on the second side of the loading and unloading station;

providing a material pallet which moves reciprocally between the loading and unloading station, and the first station or the second station;

positioning the material pallet at the loading and unloading station;

separating at least one workpiece from a plurality of workpieces carried on the material pallet, and loading the workpiece into the workpiece processing machine by means of a loading and unloading transfer device;

transferring the material pallet from the loading and unloading station to the first station or to the second station, and transferring a finished product pallet, which is movable between the loading and unloading station and the second station or the first station, to the loading and unloading station during the processing of the workpiece in the plate processing machine;

transferring a finished product processed in the plate processing machine to the finished product pallet positioned at the loading and unloading station, by means of the workpiece loading and unloading transfer device;

transferring the finished product pallet to the second station or the first station;

transferring once again the material pallet to the loading and unloading station for loading a next workpiece into the plate processing machine.

2. A device for loading a workpiece to and for unloading a finished product from a plate processing machine which processes a sheet workpiece, comprising:

a workpiece storage means positioned on one side of the plate processing machine and having a plurality of pallet storage shelves, for storing a plurality of material pallets carrying workpieces to be loaded into the plate processing machine and a plurality of finished product pallets on which are to be carried finished products processed in the plate processing machine, said shelves being arranged one above the other;

a loading and unloading means provided on a lower part of the workpiece storage means for loading the workpiece to the plate processing machine and for unloading the finished products form the plate processing machine;

a first lifter means located at the loading and unloading means for supporting and lifting up and down the material pallets or the finished product pallets;

an elevator means provided in a manner allowing vertical motion at a first station position on a first side of the loading and unloading means, for conveying a material pallet or a finished product pallet from a selected pallet storage shelf in the workpiece storage means to the first lifter means, or for conveying a material pallet or a finished product pallet on the first lifter means to a selected pallet storage shelf in the workpiece storage means;

a second lifter means provided in a manner allowing vertical motion at a second station situated on a second side of the loading and unloading means, for temporarily supporting a finished product pallet or a material pallet previously loaded on the first lifter means when the material pallet or the finished product pallet is transferred to the first lifter means from the elevator means; and the loading and unloading means including a workpiece loading and unloading transfer means for picking up at least one workpiece from the material pallet supported on the first lifter means positioned at the loading and unloading means and loading it to the plate processing machine, and for conveying the finished product processed in the plate processing machine to the finished product pallet which had been transferred onto the first lifter means.

3. The device for loading a workpiece to and for unloading a finished product from a plate processing machine of claim 2, wherein the elevator means and the second lifter means are provided with a pallet transfer means for conveying a material pallet to or for withdrawing a finished product pallet from the first lifter means.

4. A method of loading a sheet workpiece into and for unloading a finished product from a plate processing machine, comprising the steps of:

providing on one side of the plate processing machine which processes the sheet workpiece, a loading and unloading station where an operation of loading the workpiece into and of unloading a finished product from the plate processing machine is performed;

providing at the loading and unloading station a lifter device which vertically moves a material pallet carrying workpieces or a finished product pallet carrying finished products;

providing at the loading and unloading station a pallet support device for temporarily supporting a material pallet or a finished product pallet;

providing a workpiece loading and unloading transfer device which removes at least one workpiece from the material pallet, loads the workpiece to the plate processing machine, and conveys a finished product processed in the plate processing machine to the finished product pallet;

providing a vertically movable elevator device on a first station positioned on a first side of the loading and unloading station, the material pallet or the finished product pallet being movable to the pallet support device from the vertically movable elevator device;

supporting one of the finished product pallets or the material pallet on the elevator device when the other of the material pallet or the finished product pallet is supported on the lifter device;

loading a workpiece from the material pallet supported on the lifter device, or from the material pallet transferring to the pallet support device from the elevator device, to the plate processing machine by the workpiece loading and unloading transfer device;

returning the material pallet from the pallet support device to the elevator device while elevating the finished product pallet supported on the lifter device, or transferring the finished product pallet to the pallet support device from the elevator device while elevating the material pallet supported on the lifter device, during the processing of the workpiece in the plate processing machine; and transferring the finished product processed in the plate processing machine onto the finished pallet by the workpiece loading and unloading transfer device.

5. A device for loading a workpiece to and for unloading a finished product from a plate processing machine which processes a plate type workpiece, comprising:

a workpiece storage means positioned on one side of the plate processing machine and having a plurality of pallet storage shelves for storing a plurality of material pallets carrying workpieces to be loaded to the plate processing machine and a plurality of finished product pallets on which are piled finished products processed in the plate processing machine, said shelves being arranged one above the other;

a loading and unloading means provided on a lower part of the workpiece storage means for loading the workpiece to the plate processing machine and for receiving a finished product unloaded from the plate processing machine;

a lifter means at the loading and unloading means for moving the material pallets or the finished product pallets vertically;

a pallet support means at the loading and unloading means for supporting the material pallets or the finished product pallets;

an elevator means provided in a manner allowing vertical motion at a first station positioned on a first side of the loading and unloading means for conveying a material pallet or a finished product pallet from a selected pallet storage shelf in the workpiece storage means onto the pallet support means provided at the loading and unloading means, or for conveying a material pallet or a finished product pallet supported on the pallet support means to a selected pallet storage shelf in the workpiece storage means; and the loading and unloading means including a workpiece loading and unloading transfer means for removing at least one workpiece on the material pallet supported on either the lifter means or the pallet support means of the loading and unloading means, and loading it to the plate processing machine, and for unloading the finished product from the plate processing machine and conveying it to the finished product pallet supported on either the pallet support means or the lifter means.

6. The device for loading a workpiece to and for unloading a finished product from a plate processing machine of claim 5, wherein the pallet support means comprises a pallet guide member which guidingly supports the pallet, said pallet support means being positionally variable at either a first position supporting the pallet or a second position in which the pallet is vertically movable.

7. A device for loading a workpiece to and for unloading a finished product from a plate processing machine which processes a plate type workpiece, comprising:

a material pallet and a finished product pallet which can be alternately positioned to a loading and unloading station on one side of the plate processing machine;

a workpiece loading and unloading transfer means for picking up at least one workpiece from the material pallet and loading the workpiece to the plate processing machine and for unloading the finished product from the plate processing machine to convey it to the finished product pallet, the workpiece loading and unloading transfer means comprising a transfer loader which is reciprocally movable to and from the plate processing machine, a workpiece support means provided on the transfer loader for supporting the workpiece to carry it to the plate processing machine, a home position positioning means mounted on the transfer loader and movable with respect to the workpiece support means for supporting the workpiece being loaded to the plate processing machine in cooperation with the workpiece support means and for positioning the workpiece at a home position in the plate processing machine, a clamp means for clamping an end of the finished product processed in the plate processing machine, and a drive means for driving the transfer loader.

8. The device for loading a workpiece to and for unloading a finished product from a plate processing machine of claim 7, wherein the clamp means is movable in a direction for feeding the workpiece to the home position positioning means.

9. A device for loading a workpiece to and for unloading a finished product from a plate processing machine which processes a plate type workpiece, comprising:

a material pallet and a finished product pallet which can be alternately positioned to a loading and unloading station on one side of the plate processing machine;

a workpiece loading and unloading transfer means for picking up at least one workpiece from the material pallet and loading the workpiece to the plate processing machine and for unloading the finished product from the plate processing machine to convey it to the finished product pallet, the workpiece loading and unloading transfer means comprising a transfer loader which is reciprocally movable to and from the plate processing machine, a home position positioning means for supporting the workpiece being loaded to the plate processing machine and for positioning the workpiece at a home position in the plate processing machine, a clamp means for clamping an end of the finished product processed in the plate processing machine, the clamp means and the home positioning means being pivotable in a vertical plane and a drive means for driving the transfer loader.

10. The device for loading a workpiece to and for unloading a finished product from a plate processing machine of claim 9, wherein the home position positioning means is movable in a direction for feeding the workpiece and in a direction at right angles to the direction for feeding the workpiece.

* * * * *